May 8, 1928.
G. KELLY
1,668,913
LAWN MOWER SHARPENER
Filed Jan. 19, 1926
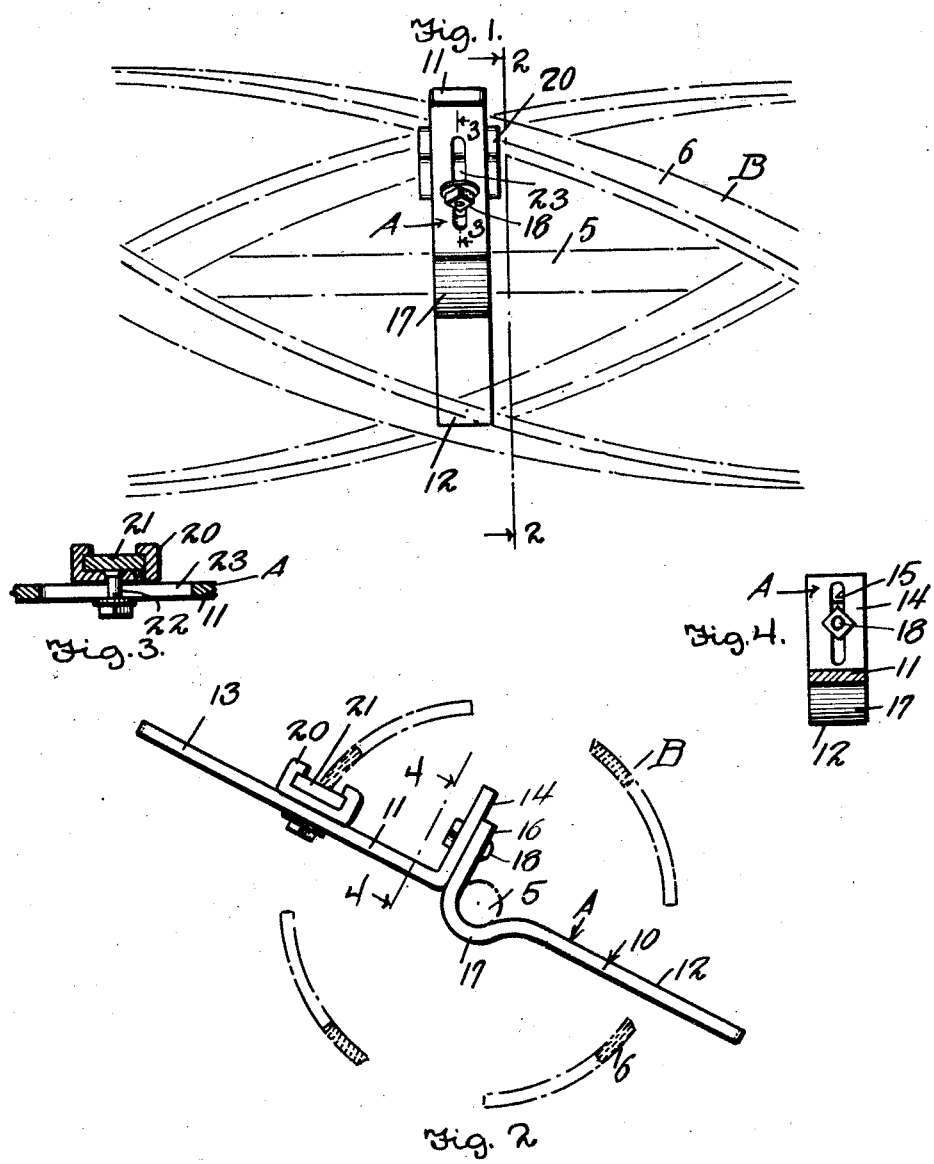
George Kelly INVENTOR.
BY Richard B. Owen
ATTORNEY.
Witnesses
C. E. Churchman Jr.
George W. Wright Patented May 8, 1928.

1,668,913

UNITED STATES PATENT OFFICE.

GEORGE KELLY, OF GOODLAND, KANSAS, ASSIGNOR TO ROBINSON LOFTEN LATCH COMPANY, OF COPE, COLORADO.

LAWN-MOWER SHARPENER.

Application filed January 19, 1926. Serial No. 82,358.

This invention appertains to a novel sharpening device for the blades of lawn mowers and the primary object of the invention is to provide a sharpener, which can be readily connected to and detached from the lawn mower for sharpening the blades thereof, the device being so constructed as to permit the effective sharpening of the blades by the ordinary layman, thereby rendering the employment of an expert sharpener unnecessary.

Another object of the invention is the provision of a lawn mower sharpener embodying a novel handle for carrying the sharpening element and novel means formed on the handle for engaging the shaft of the lawn mower, so as to permit longitudinal movement of the handle on the shaft to bring about the successful sharpening of the blades.

A further object of the invention is the provision of novel means for permitting the adjustment of the handle frame, so as to allow the desired engagement thereof with the lawn mower shaft and novel means for associating the sharpening element with the handle frame, whereby the same can be held in various positions relative to the shaft, so as to allow different sizes of lawn mowers to be acted upon. A still further object of the invention is to provide an improved lawn mower sharpener of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a front elevation of the improved sharpener showing the same applied to the rotary cutter of a lawn mower, the cutter being shown in dotted lines, Figure 2 is a side elevation of the improved sharpener showing the same applied to the rotary cutter of a lawn mower, the cutter being shown in dotted lines, Figure 3 is a fragmentary longitudinal section through the cutter taken on the line 3—3 of Figure 1 looking in the direction of the arrows illustrating the novel means for mounting the sharpening element in position on the frame, Figure 4 is a detail transverse section through the improved sharpener taken on the line 4—4 of Figure 2 looking in the direction of the arrows, illustrating the formation of the frame so as to permit the engagement thereof with the shaft of the lawn mower, Referring to the drawings in detail, wherein similar reference characters designate corresponding parts throughout the several views, the letter A generally indicates the improved lawn mower sharpener and B the rotary cutting element of a lawn mower.

The rotary cutting element B of the lawn mower is of any conventional character, and as shown includes the usual rotary shaft 5, and the spaced cutting blades 6, which are arcuately arranged relative to the axis of the shaft, so as to bring about a shearing cut relative to the stationary blade (not shown in the drawings).

The improved lawn mower sharpener A comprises a frame 10 which in turn includes a pair of handle sections 11 and 12. The handle sections 11 and 12 are preferably formed from strap iron and includes straight hand grip portions 13 at the outer ends thereof. If preferred the hand grip portions 13 can be shaped in any desired way to permit the easy gripping thereof or have wooden or other type of conventional grips connected therewith. The extreme inner end of the handle section 11 is provided with a right angularly extended leg portion 14 having formed therein a longitudinally extending slot 15, for a purpose, which will be hereinafter more fully described. The inner end of the handle section 12 is likewise provided with a right angularly extending arm 16 which is adapted to abut and slidably engage the arm 14. At the point of connection of the arm 16 with the body portion of the handle section an arcuate bearing portion or shaft receiving guide 17 is provided. In use of the improved sharpener the frame 10 is placed diametrically through the rotary cutting element B and the arcuate guide 17 is placed upon the shaft 5, as clearly shown in Figures 1 and 2 of the drawings. The handle sections 11 and 12 are then adjusted relative to one another so as to position the section 11 relative to the active cutting edge of the blade which is to be sharpened. This is accomplished by adjusting the bolt 18 which is carried by the arm 16 and extended through the slot 15 in the arm 14. It is obvious that loosening and tightening the said bolt that the handle sections can be relatively adjusted.

Slidably mounted upon the handle sections 11 is a transversely extending holder or guide 20 for abrasive materials 21 which can be in the nature of a file, if preferred. This holder 20 carries a stud bolt 22 which is extended through the longitudinally extending slot 23 formed in said handle section 11. By this arrangement the file or other abrading member can be adjusted toward and away from the axis of the cutter so that various sizes of blades or cutters can be acted upon.

In use of the improved device, after the sharpener has been placed in position as shown and described the handles are grasped and the sharpener is moved longitudinally on the shaft with the file engaged with the active edge of the blade which is to be sharpened. The abrading element 21 will readily follow the edge of the blade and by reciprocating the sharpener the desired number of times, the edge will be sharpened.

Changes in details may be made without departing from the spirit or scope of this invention, but:

What I claim as new is:

1. A lawn mower sharpener comprising a frame adapted to extend diametrically through the rotary cutting element of a lawn mower, hand grips formed on the opposite ends of the frame, an arcuate guide formed on the frame for slidably engaging the shaft of the rotary cutting element, a holder secured to the frame at a point remote from the guide, and a sharpening element arranged in the holder for engaging the active edge of the blade of the rotary element which is to be sharpened.

2. As a new article of manufacture, a lawn mower sharpener comprising a frame including a pair of straight handle sections, right angularly extending abutting arms formed on the inner ends of the handle sections shaped to form a guide, means adjustably connecting the arms together to permit the adjustment of one section relative to the other, an adjustable file receiving frame mounted upon one of said handle sections.

3. As a new article of manufacture, a lawn mower sharpener comprising a pair of companion handle frames adapted to extend diametrically through the rotary cutting element of a lawn mower, right angularly extending abutting arms formed on the inner ends of the handle sections, means adjustably connecting said arms together, an arcuate guide formed on one of said sections adjacent to its arm for engaging the shaft of the rotary cutting element, and a sharpening element holder adjustably carried by the other handle section and adjustable toward and away from said guide.

4. As a new article of manufacture, a lawn mower sharpener comprising a pair of straight handle sections, right angularly extending arms formed on the inner ends of said sections, means adjustably connecting said arms together to permit the adjustment of said sections relative to one another, an arcuate lawn mower shaft guide formed on one of said sections adjacent to said arms, a holder adjustably mounted upon the other section movable toward and away from said arms, and a file extending transversely of the frame mounted in said holder.

5. A lawn mower sharpener comprising a pair of straight handled sections arranged in the same plane adapted to extend diametrically through the rotary cutting element of a lawn mower, an arcuate guide formed on one of the handle sections and offset therefrom, a sharpening element adjustably carried by the other section, and means for adjustably connecting the sections together.

6. A lawn mower sharpener comprising a pair of straight handle sections arranged in the same plane adapted to extend diametrically through the rotary cutting element of a lawn mower, an arcuate guide formed on one of the handle sections and offset therefrom for slidably engaging the shaft of the rotary cutting element, a sharpening implement adjustably carried by the other section, and means for adjustably connecting the sections together, including a pair of right angularly extending abutting arms and a fastening element extending through said arms, one of said arms forming a continuation of the guide.

In testimony whereof I affix my signature.

GEORGE KELLY.